(12) United States Patent
Yan et al.

(10) Patent No.: US 10,161,468 B2
(45) Date of Patent: Dec. 25, 2018

(54) TWO-STAGE STIFFNESS TYPE ELASTOMER COMBINED DEVICE

(71) Applicant: CRRC YANGTZE CORPORATION LIMITED, Wuhan (CN)

(72) Inventors: Zhixiong Yan, Wuhan (CN); Ruijin Jiang, Wuhan (CN); Liangwei Zhang, Wuhan (CN); Hong Cui, Wuhan (CN); Fengwei Liu, Wuhan (CN); Wenliang Liu, Wuhan (CN); Tiejun Fu, Wuhan (CN); Zhaojun Dan, Wuhan (CN)

(73) Assignee: CRRC Yangtze Corporation Limited, Wuhan, Hubei (CN)

( * ) Notice: Subject to any disclaimer, the term of this patent is extended or adjusted under 35 U.S.C. 154(b) by 0 days.

(21) Appl. No.: 14/784,933

(22) PCT Filed: Oct. 31, 2014

(86) PCT No.: PCT/CN2014/090007
§ 371 (c)(1),
(2) Date: Oct. 15, 2015

(87) PCT Pub. No.: WO2015/101094
PCT Pub. Date: Jul. 9, 2015

(65) Prior Publication Data
US 2016/0146284 A1  May 26, 2016

(30) Foreign Application Priority Data

Dec. 30, 2013  (CN) .......................... 2013 1 0746689
Dec. 30, 2013  (CN) ..................... 2013 2 0884672 U

(51) Int. Cl.
*F16F 3/093*   (2006.01)
*B61F 5/30*    (2006.01)
*F16F 3/087*   (2006.01)

(52) U.S. Cl.
CPC .............. *F16F 3/093* (2013.01); *B61F 5/305* (2013.01); *F16F 3/0873* (2013.01)

(58) Field of Classification Search
CPC .......... F16F 3/093; F16F 3/0873; B61F 5/305
See application file for complete search history.

(56) References Cited

U.S. PATENT DOCUMENTS 3,287,749 A * 11/1966 Marsico ................. A47C 27/05
5/716
3,537,696 A * 11/1970 Webster, Jr. ........... B60G 17/02
267/293

(Continued)

FOREIGN PATENT DOCUMENTS

CN         201232724      5/2009
CN         103697098      4/2014
(Continued)

OTHER PUBLICATIONS

CN 201866147 English abstract and drawing (Year: 2011).*

*Primary Examiner* — Melody M Burch
(74) *Attorney, Agent, or Firm* — Chernoff Vilhauer LLP

(57) ABSTRACT

The present invention provides a two-stage stiffness type elastomer combined device, including at least one small-stiffness elastic element and a large-stiffness elastic element, wherein the small-stiffness elastic element is arranged in an elastomer pre-compression device and is serially arranged with the large-stiffness elastic element under the action of a pre-compression load F1. The device has combined stiffness being hard at first and then becoming soft and is used as an elastic axle box suspension device of a railway vehicle, effectively solving the contradiction that a linear snaking critical operation speed of the vehicle and curve passing performance of the vehicle cannot be compromised. The device can also be applied to a variety of occasions requiring combined stiffness being soft at first and then becoming hard (Continued)

of an elastomer damping device between related members of the railway vehicle, so as to buffer the wheel rail impact of the vehicle, improve the dynamic performance of the vehicle and guarantee the operation safety of the vehicle to perfect the operation quality of the railway vehicle.

8 Claims, 4 Drawing Sheets

(56) References Cited

U.S. PATENT DOCUMENTS

| | | | | |
|---|---|---|---|---|
| 3,836,134 | A * | 9/1974 | Lowe | F16F 13/002 |
| | | | | 267/152 |
| 4,416,445 | A * | 11/1983 | Coad | F16F 9/08 |
| | | | | 137/493.8 |
| 5,761,856 | A * | 6/1998 | Kishizono | E04H 9/022 |
| | | | | 52/167.7 |
| 2004/0173955 | A1 * | 9/2004 | Groth | F16F 13/06 |
| | | | | 267/140.13 |
| 2009/0140478 | A1 * | 6/2009 | Siemer | F16F 13/1409 |
| | | | | 267/140.12 |

FOREIGN PATENT DOCUMENTS

| | | |
|---|---|---|
| CN | 203655996 | 6/2014 |
| EP | 81035 A2 * | 12/1997 |
| EP | 1314909 | 5/2003 |

* cited by examiner

TWO-STAGE STIFFNESS TYPE ELASTOMER COMBINED DEVICE

FIELD OF THE INVENTION

The present invention relates to an elastomer buffering and damping device, and particularly, to a two-stage stiffness type elastomer combined device, which is mainly used between railway vehicle members for buffering and damping.

BACKGROUND OF THE INVENTION

A railway vehicle is a special vehicle operating on special rails, and when operating along the special rails, the railway vehicle can be self-oriented without being controlled in direction. A bogie is one of the most important components on the railway vehicle, and it supports the weight of an entire commodity and the weight of the vehicle body. The traditional bogies is mostly of a structure with three large parts, namely, two side frame components and a swing bolster component, guide frames on both ends of the side frame components are installed on front and back wheel pair components through axle box bearing saddles and bearing devices, and both ends of the swing bolster component are installed in central square frames of the side frame components through two groups of central suspension devices. The axle box bearing saddles and the bearing devices are movable joints contacting the side frame components with the wheel pair components, are used for converting rolling of wheels along the rail route into translation of the vehicle body along the rail route and can flexibly operate along a straight line and successfully pass by a curve.

When the railway vehicle operates at a high speed on the rails, complex impact and vibration will be produced accordingly. In order to reduce a variety of dynamic effects of unsmooth rail routes and high speed motion of wheel pairs on the vehicle body, for example, longitudinal impact, vertical vibration, lateral vibration and the like, those skilled in the art often set elastic damping devices between related vehicle members according to different vehicle conditions. For example, an elastic axle box suspension device is arranged between the guide frame of the side frame of the bogie and the wheel pair component, the elastic axle box suspension device generally includes a vertical elastic device located between the top face of the axle box bearing saddle and the bottom surface of the guide frame of the side frame and a longitudinal elastic device located between the axle box bearing saddle and the two side faces of the guide frame of the side frame, and the elastic axle box suspension device plays an important role in such aspects as whether the linear operation of the vehicle is stable, whether the vehicle can successfully pass by the curve, and guaranteeing the safe operation of the vehicle, and the like.

With the continuous increase of the load capacity of the railway vehicle, the axle weight of the vehicle increases constantly, and the operation speed of the vehicle is continuously improved, so that the requirements on the quality and performance of the vehicle bogie is also higher and higher. At a state of heavy load and high speed, when moving along the rails, the vehicle wheel pairs are easier to initiate yaw motion of the vehicle body, resulting in greatly reduced operation quality of the vehicle and will cause a vehicle derailment accident seriously. Meanwhile, when the vehicle passes by the curve, the lateral force of the wheel rail cannot be too large, otherwise, the vehicle is also possible to derail.

One of the critical components directly affecting the snaking critical operation speed of the railway vehicle on a straight line and the passing performance of the vehicle on a curve is the longitudinal elastic device in the above-mentioned elastic axle box suspension device, and the structural shape design and the elastic stiffness parameter design thereof are of vital importance. In order to increase the snaking critical operation speed of the railway vehicle on the straight line, larger longitudinal positioning stiffness thereof must be required; when the vehicle passes by the curve, to prevent an over large lateral force of the wheel rail, smaller longitudinal positioning stiffness thereof must be required.

At present, improving the snaking critical operation speed of the vehicle on the straight line and improving the passing performance of the vehicle on the curve are a pair of contradictions, and thus it is very hard to give consideration to both in the specific design of the above-mentioned longitudinal elastic device. This is because the existing elastic device is usually composed of two or more elastomers connected in series, in parallel, or in series and parallel. For example, a serial structure of three elastomers $K_1$, $K_2$, $K_3$ as shown in FIG. 1, a parallel structure of three elastomers $K_1$, $K_2$, $K_3$ as shown in FIG. 2 and a series-parallel structure of seven elastomers $K_1$-$K_7$ as shown in FIG. 3. The common feature of these elastic devices lies in that the combined stiffness is generally linear stiffness or stiffness being small at first and then becoming large, and more simply, stiffness being soft at first and then becoming hard. When being applied with an external load P, the elastomer with smaller stiffness will bear the load at first to generate a larger deformation displacement, and then the elastomer with larger stiffness bears the load to generate a smaller deformation displacement. When being specifically applied to the above-mentioned longitudinal elastic device, due to the limitation of the combined stiffness being soft at first and then becoming hard, the increase of the deformation displacement corresponds to the load linearly or in an equal proportional increase manner. In this case, the large stiffness requirement of the linear snaking critical operation speed of the vehicle and the small stiffness requirement of the curve passing performance of the vehicle cannot be completely compromised, meanwhile the risk of train derailment also exists, and thus the buffering and damping function is greatly reduced.

How to effectively improve the linear stability and the curve passing performance of the heavy-loaded vehicle operates at a high speed is always a problem attempted to be solved by those skilled in the art, and this has an important practical significance of improving the operation quality of the railway vehicle and guaranteeing the safety performance of the railway vehicle.

SUMMARY OF THE INVENTION

The purpose of the present invention is to provide a two-stage stiffness type elastomer combined device, which has combined stiffness being soft at first and then becoming hard, can be both applied to an elastic axle box suspension device to give consideration to both of a linear snaking critical operation speed of a railway vehicle and a curve passing performance requirement of the vehicle, and can be applied to occasions needing similar buffering and damping between related members of the railway vehicle.

To fulfill the above-mentioned purpose, the special features of the two-stage stiffness type elastomer combined device designed in the present invention lie in that the two-stage stiffness type elastomer combined device is provided with at least one small-stiffness elastic element and a large-stiffness elastic element, wherein the small-stiffness elastic element is arranged in an elastomer pre-compression device and is serially arranged with the large-stiffness elastic element under the action of a pre-compression load F1; meanwhile, in a process of a working load F2 becoming from small to large, the two-stage stiffness type elastomer combined device satisfies the following relationship: when F2 is smaller than F1, the large-stiffness elastic element is compressed to deform at first; when F2 is equal to F1, the large-stiffness elastic element and the pre-compressed small-stiffness elastic element are at a critical state; until when F2 is larger than F1, the small-stiffness elastic element starts to be continuously compressed to deform, so that the elastomer combined device has a two-stage variable stiffness property being hard at first and then becoming soft at the load state.

As a first preferable solution the large-stiffness elastic element is provided with an elastic rubber base layer, and the elastic rubber base layer is clamped between two metal bearing plates and is vulcanized into an entirety with the same.

The elastomer pre-compression device is provided with a rigid outer cover, an oriented positioning screw is axially arranged in the rigid outer cover, one end of the oriented positioning screw stretches out from the opening of the rigid outer cover to be fixedly connected with one of the two metal bearing plates, and the other end of the oriented positioning screw stretches out from the bottom surface of the rigid outer cover to form threaded connection with a locking nut.

The small-stiffness elastic element is provided with a conical cylindrical rubber layer, the conical cylindrical rubber layer is arranged between the inner wall of the rigid outer cover and the oriented positioning screw and is vulcanized into an entirety with the same, and the conical cylindrical rubber layer is at a pre-compression state under the tightening function of the locking nut.

As a second preferable solution the structures of the large-stiffness elastic element and the elastomer pre-compression device are the same as those in the first preferable solution. The difference lies in that the small-stiffness elastic element is provided with a cylindrical overlapped rubber layer integrally vulcanization molded by multiple layers of sheet metals and multiple layers of sheet rubber, which are arranged in a staggered manner, the cylindrical overlapped rubber layer is sleeved on the oriented positioning screw, one end of the cylindrical overlapped rubber layer is propped against one of the two metal bearing plates, the other end of the cylindrical overlapped rubber layer is propped against the bottom surface of the rigid outer cover, and the cylindrical overlapped rubber layer is at a pre-compression state under the tightening function of the locking nut.

As a third preferable solution the structures of the large-stiffness elastic element and the elastomer pre-compression device are the same as those in the first preferable solution. The difference lies in that the small-stiffness elastic element is provided with a metal helical spring, the metal helical spring is sleeved on the oriented positioning screw, one end of the metal helical spring is propped against one of the two metal bearing plates, the other end of the metal helical spring is propped against the bottom surface of the rigid outer cover, and the metal helical spring is at a pre-compression state under the tightening function of the locking nut.

The commonality of the above three preferable solutions is that the large-stiffness elastic element and the oriented positioning screw are integrally designed and apply the pre-compression load F1 to the small-stiffness elastic element together.

As a fourth preferable solution the large-stiffness elastic element is provided with an elastic rubber base layer, and the elastic rubber base layer is clamped between two metal bearing plates and is vulcanized into an entirety with the same.

The elastomer pre-compression device is provided with a rigid outer cover, an oriented positioning screw is axially arranged in the rigid outer cover, one end of the oriented positioning screw stretches out from the opening of the rigid outer cover to be fixedly connected with an end face baffle, the other end oldie oriented positioning screw stretches out from the bottom surface of the rigid outer cover to form threaded connection with a locking nut, the end face baffle is propped against one of the two metal bearing plates, and a positioning lug boss is arranged on the end face of the other metal bearing plate.

The small-stiffness elastic element is provided with a metal helical spring, the metal helical spring is sleeved on the oriented positioning screw, one end of the metal helical spring is propped against the end face baffle, the other end of the metal helical spring is propped against the bottom surface of the rigid outer cover, and the metal helical spring is at a pre-compression state under the tightening function of the locking nut.

The property of this structure lies in that the large-stiffness elastic element and the oriented positioning screw are separately designed, and the pre-compression load F1 is applied on the small-stiffness elastic element through the end face baffle. Further, both the small-stiffness elastic element and the large-stiffness elastic element can be composed of two or more independent elastic elements which are combined in series, in parallel or in series and parallel. In this way, the physical properties of the small-stiffness elastic element and the large-stiffness elastic element can be flexibly adjusted according to actual demands to satisfy the demands of buffering and damping devices under different working conditions.

The main working principle of the present invention is as follows: the designed two-stage stiffness type elastomer combined device is composed of the small-stiffness elastic element and the large-stiffness elastic element, which are installed in the elastomer pre-compression device in a compression manner and are connected in series. When the two-stage stiffness type elastomer combined device bears a load, since the initial load is smaller than the set pre-compression load of the small-stiffness elastic element, the large-stiffness elastic element bears the load at first; with the gradual increase of the load, the deformation displacement of the two-stage stiffness type elastomer combined device will increase slowly; but once the load is larger than the set pre-compression load of the small-stiffness elastic element, the small-stiffness elastic element starts to bear the load, and since the stiffness thereof is small, the deformation displacement of the small-stiffness elastic element will increase quickly after bearing the load, so as to achieve the two-stage variable stiffness property being soft at first and then becoming hard of the two-stage stiffness type elastomer combined device.

The present invention has the following advantages: the designed two-stage stiffness type elastomer combined device is simple in structure, scientific in principle, smart in design and is very easy to achieve the spring stiffness property, which is hard at first and then becomes soft. When being applied to the elastic axle box suspension device of the railway vehicle, the two-stage stiffness type elastomer combined device has larger compression stiffness when the deformation displacement is very small, so that the railway vehicle can be guaranteed to have a higher snaking critical operation speed when operating on the straight line, and the acceleration operation demand of the vehicle is satisfied; when the deformation displacement reaches a set numerical value, the compression stiffness starts to become small, so that when the railway vehicle passes by the curve, it can be guaranteed that the lateral force between the wheel rails will not be too large to guarantee the curve operation safety of the vehicle, and thus the contradiction that the linear snaking critical operation speed of the vehicle and the curve passing performance of the vehicle cannot be compromised is effectively solved. Meanwhile, the present invention can also be applied to a variety of occasions requiring combined stiffness being soft at first and then becoming hard of the elastomer damping device between related members of the railway vehicle, so as to buffer the wheel rail impact of the vehicle, improve the dynamic performance of the vehicle and guarantee the operation safety of the vehicle to greatly perfect the operation quality of the railway vehicle.

Figure 1:
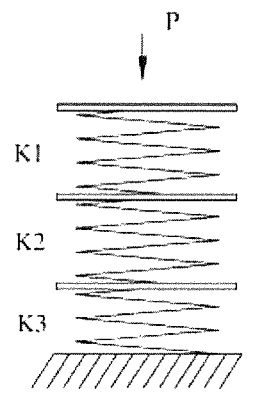
FIG. 1 is a schematic diagram of a serial structure of three elastomers in the prior art.

Mark numbers of the components in the figures are as follows: elastomers K1-K7; external load P; small-stiffness elastic element 1 (wherein: conical cylindrical rubber layer 1a, cylindrical overlapped rubber layer 1b, metal helical spring 1c); large-stiffness elastic element 2 (wherein: elastic rubber base layer 2a, metal bearing plate 2b, positioning lug boss 2c); elastomer pre-compression device 3 (wherein: rigid outer cover 3a, oriented positioning screw 3b, locking nut 3c, end face baffle 3d); guide frame 4 of side frame; axle box bearing saddle 5.

DETAILED DESCRIPTION OF THE EMBODIMENTS

To better explain the present invention, the main contents of the present invention will be further illustrated below in combination with the accompanying drawings and specific embodiments, but the contents of the present invention are not merely limited to the following embodiments.

Figure 2:
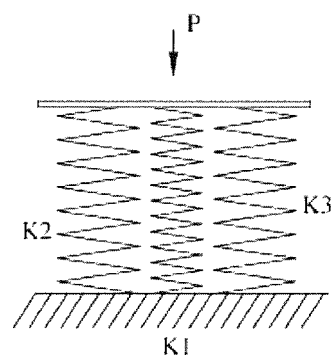
FIG. 2 is a schematic diagram of a parallel structure of three elastomers in the prior art.
Figure 3:
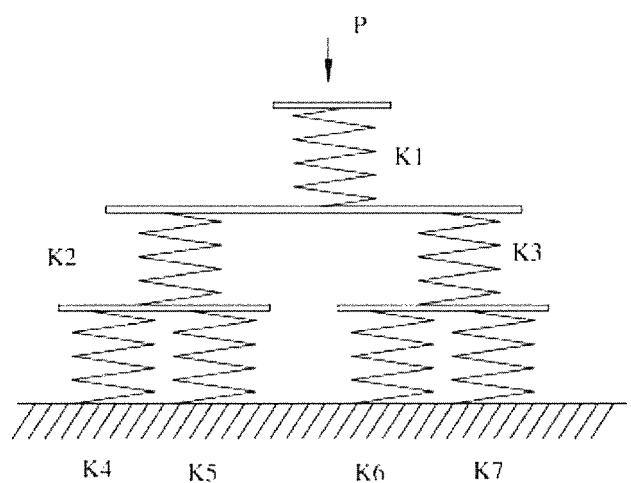
FIG. 3 is a schematic diagram of a series-parallel structure of seven elastomers in the prior art.

The elastomer combined structure in the prior art as shown in FIG. 1 to FIG. 3 has been described in the background art, and will not be repeated redundantly herein.

Figure 4:
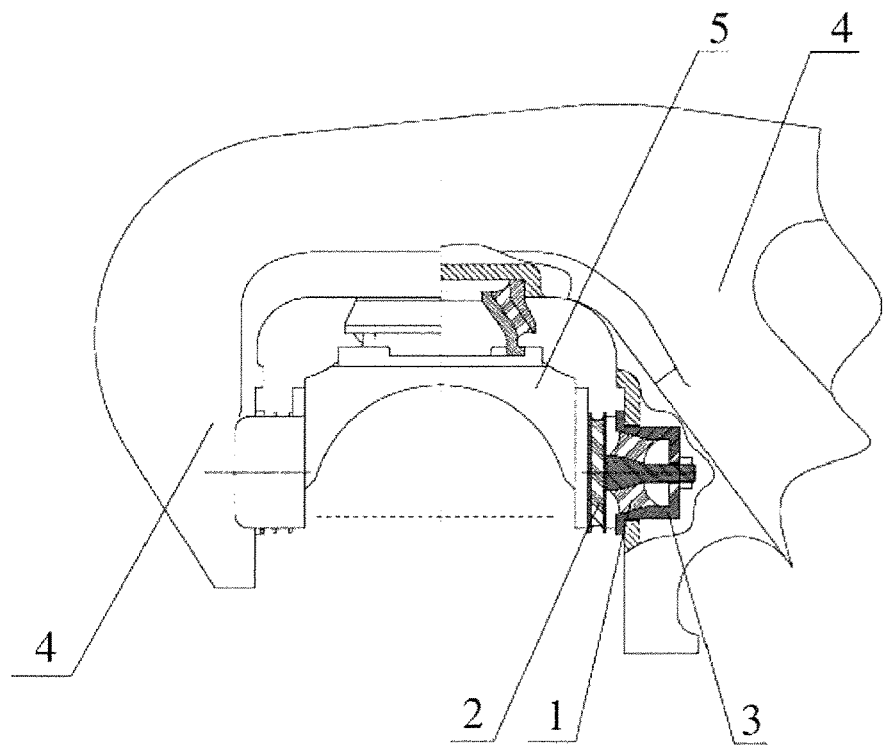
FIG. 4 is a schematic diagram of a mounting position of a first two-stage stiffness type elastomer combined device between an axle box bearing saddle and front and back side faces of a guide frame of a side frame of a railway vehicle bogie.

As shown in FIG. 4, the first two-stage stiffness type elastomer combined device of the present invention is installed between a guide frame 4 of a side frame of a railway vehicle bogie and front and back side faces of an axle box bearing saddle 5, and is provided with a small-stiffness elastic element 1 and a large-stiffness elastic element 2, wherein the small-stiffness elastic element 1 is arranged in an elastomer pre-compression device 3 and is serially arranged with the large-stiffness elastic element 2 under the action of a pre-compression load F1.

Figure 5:
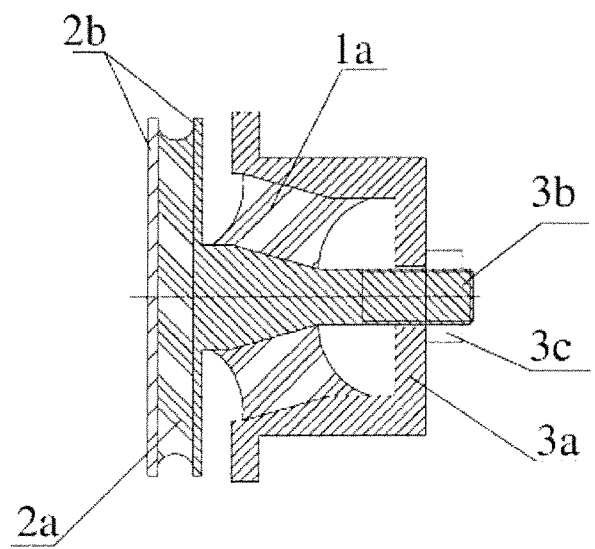
FIG. 5 is a schematic diagram of a sectional structure of a first two-stage stiffness type elastomer combined device.

As shown in FIG. 5, the large-stiffness elastic element 2 is provided with an elastic rubber base layer 2a, and the elastic rubber base layer 2a is clamped between two metal bearing plates 2b and is vulcanized into an entirety with the same. The elastomer pre-compression device 3 is provided with a rigid outer cover 3a, an oriented positioning screw 3b is axially arranged in the rigid outer cover 3a, one end of the oriented positioning screw 3b stretches out from the opening of the rigid outer cover 3a to be fixedly connected with one metal bearing plate 2b, and the other end of the oriented positioning screw 3b stretches out from the bottom surface of the rigid outer cover 3a to form threaded connection with a locking nut 3c. The small-stiffness elastic element 1 is provided with a conical cylindrical rubber layer 1a, and the conical cylindrical rubber layer 1a is arranged between the inner wall of the rigid outer cover 3a and the oriented positioning screw 3b and is vulcanized into an entirety with the same. The conical cylindrical rubber layer 1a is at a pre-compression state under the action of the pre-compression load F1, after the locking nut 3c is tightened.

Meanwhile, in a process of a working load F2 becoming from small to large, the two-stage stiffness type elastomer combined device satisfies the following relationship: when F2 is smaller than F1, the large-stiffness elastic element 2 is compressed to deform at first; when F2 is equal to F1, the large-stiffness elastic element 2 and the pre-compressed small-stiffness elastic element 1 are at a critical state; until when F2 is larger than F1, the small-stiffness elastic element 1 starts to be continuously compressed to deform, so that the elastomer combined device has a two-stage variable stiffness property being hard at first and then becoming soft at the load state.

Still as shown in FIG. 4, when the first two-stage stiffness type elastomer combined device is assembled, the rigid outer cover 3a of the elastomer pre-compression device 3 is detachably embedded into a side face mounting hole of the guide frame 4 of the side frame, and the other metal bearing plate 2b of the large-stiffness elastic element 2 is propped on the side face of the axle box bearing saddle 5 under the action of the small-stiffness elastic element 1.

In an operation process of the railway vehicle, when the above-mentioned two-stage stiffness type elastomer combined device bears a load, since the initial load is smaller than the pre-compression load F1 of the small-stiffness elastic element 1, the large-stiffness elastic element 2 bears the load at first. In this way, the two-stage stiffness type elastomer combined device has larger compression stiffness when the deformation displacement is very small, so that the railway vehicle can be guaranteed to have a higher snaking critical operation speed when operating on a straight line, and the acceleration operation demand of the vehicle is satisfied. With the gradual increase of the load, the deformation displacement of the two-stage stiffness type elastomer combined device will increase slowly. Once the load is larger than the pre-compression load F1 of the small-stiffness elastic element 1, the small-stiffness elastic element 1 starts to bear the load. At this time, the compression stiffness of the two-stage stiffness type elastomer combined device starts to become small, and the deformation displacement thereof will increase quickly to achieve the two-stage variable stiffness property being soft at first and then becoming hard, so that when the railway vehicle passes by a curve, it can be guaranteed that the lateral force between the wheel rails will not be too large to guarantee the curve operation safety of the vehicle.

Figure 6:
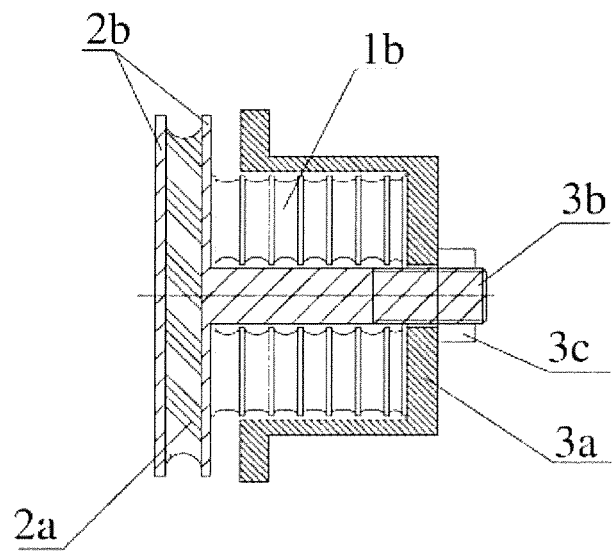
FIG. 6 is a schematic diagram of a sectional structure of a second two-stage stiffness type elastomer combined device.

As shown in FIG. 6, in the second two-stage stiffness type elastomer combined device of the present invention, the structures of the large-stiffness elastic element 2 and the elastomer pre-compression device 3 are completely the same as those in the first two-stage stiffness type elastomer combined device, and only the small-stiffness elastic element 1 is different. The small-stiffness elastic element 1 is provided with a cylindrical overlapped rubber layer 1b integrally vulcanization molded by multiple layers of sheet metals and multiple layers of sheet rubber, which are arranged in a staggered manner, the cylindrical overlapped rubber layer 1b is sleeved on the oriented positioning screw 3b, one end of the cylindrical overlapped rubber layer 1b is propped against one metal bearing plate 2b, and the other end of the cylindrical overlapped rubber layer 1b is propped against the bottom surface of the rigid outer cover 3a. The cylindrical overlapped rubber layer 1b is at a pre-compression state under the action of the pre-compression load F1, after the locking nut 3c is tightened.

Figure 7:
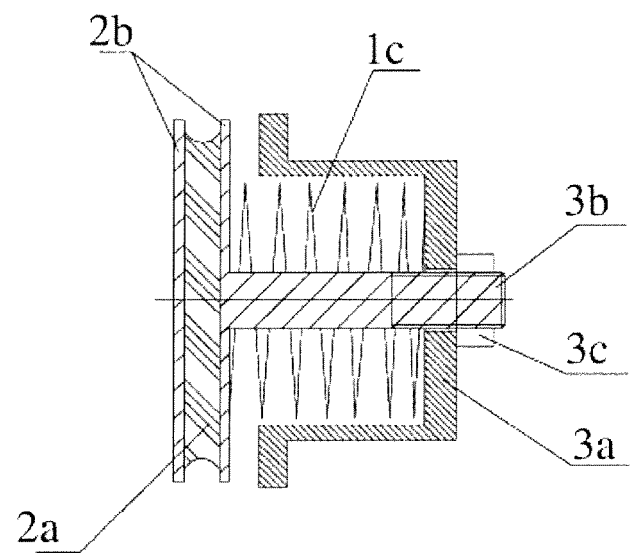
FIG. 7 is a schematic diagram of a sectional structure of a third two-stage stiffness type elastomer combined device.

In the third two-stage stiffness type elastomer combined device as shown in FIG. 7, the structures of the large-stiffness elastic element 2 and the elastomer pre-compression device 3 are completely the same as those in the first two-stage stiffness type elastomer combined device, and only the small-stiffness elastic element 1 is different. The small-stiffness elastic element 1 is provided with a metal helical spring, 1c, the metal helical spring 1c is sleeved on the oriented positioning screw 3b, one end of the metal helical spring 1c is propped against one metal bearing plate 2b, and the other end of the metal helical spring 1c is propped against the bottom surface of the rigid outer cover 3a. The metal helical spring 1c is at a pre-compression state under the action of the pre-compression load F1, after the locking nut 3c is tightened.

Figure 8:
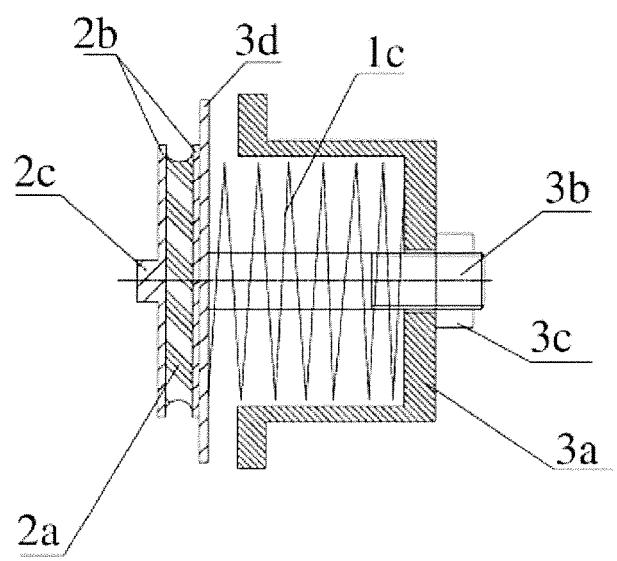
FIG. 8 is a schematic diagram of a sectional structure of a fourth two-stage stiffness type elastomer combined device.

The structure of the fourth two-stage stiffness type elastomer combined device as shown in FIG. 8 is the same in essentials while differing in minor points with the above-mentioned three two-stage stiffness type elastomer combined devices. The large-stiffness elastic element 2 is provided with an elastic rubber base layer 23, and the elastic rubber base layer 2a is clamped between two metal bearing plates 2b and is vulcanized into an entirety with the same. The elastomer pre-compression device 3 is provided with a rigid outer cover 3a, an oriented positioning screw 3h is axially arranged in the rigid outer cover 3a, one end of the oriented positioning screw 3b stretches out from the opening of the rigid outer cover 3a to be fixedly connected with an end face baffle 3d, the other end of the oriented positioning screw 3b stretches out from the bottom surface of the rigid outer cover 3a to form threaded connection with a locking nut 3c, the end face baffle 3d is propped against one metal bearing plate 2b, and a positioning lug boss 2c is arranged on the end lace of the other metal bearing plate 2b. The small-stiffness elastic element 1 is provided with a metal helical spring 1c, the metal helical spring 1c is sleeved on the oriented positioning screw 3b, one end of the metal helical spring 1c is propped against the end face baffle 3d, the other end of the metal helical spring 1c is propped against the bottom surface of the rigid outer cover 3a, and the metal helical spring 1c is at a pre-compression state under the action of the pre-compression load F1, after the locking nut 3c is tightened.

When the fourth two-stage stiffness type elastomer combined device is assembled, the rigid outer cover 3a of the elastomer pre-compression device 3 is detachably embedded into a side face mounting hole of the guide frame 4 of the side frame, the positioning lug boss 2c on the end face of the other metal bearing plate 2b of the large-stiffness elastic element 2 is suspended in the side face mounting hole of the axle box bearing saddle 5 and is extrusion positioned by the metal helical spring 1c and the end face baffle 3d; the obtained effect is the same as that in the foregoing three embodiments.

The invention claimed is:

1. An elastomer combined device comprising:
   at least one small-stiffness elastic element; and
   a large-stiffness elastic element, wherein the large-stiffness elastic element includes an elastic rubber base layer and two metal bearing plates, the metal bearing plates being planar and having opposed inner surfaces;
   wherein the small-stiffness elastic element is arranged in an elastomer pre-compression device and is serially arranged with the large-stiffness elastic element under the action of a pre-compression load F1, wherein the two metal bearing plates include first and second metal bearing plates, the first metal bearing plate being adjacent to the small-stiffness elastic element and the second metal bearing plate being spaced from the small-stiffness elastic element relative to the first metal bearing plate, wherein the elastomer pre-compression device is provided with a rigid outer cover, an oriented positioning screw is arranged in the rigid outer cover along a longitudinal axis, one end of the oriented positioning screw is fixedly and directly connected to the first metal bearing plate of the large-stiffness elastic element, and the other end of the oriented positioning screw stretches out from the bottom surface of the rigid outer cover to form a threaded connection with a locking nut, wherein the at least one small-stiffness elastic element is arranged between the rigid outer cover and the oriented positioning screw, wherein the first and second metal bearing plates are generally of equal length as measured perpendicular to the longitudinal axis,
   wherein the at least one small-stiffness elastic element is directly coupled to the oriented positioning screw, and wherein the elastic rubber base layer is clamped between the first and second metal bearing plates and is vulcanized with the first and second metal bearing plates so that (a) the opposed inner surfaces of the first and second metal bearing plates define a recess therebetween having a width that is measured parallel to the longitudinal axis and a length that is measured perpendicular to the width, and (b) the elastic rubber base layer spans the entire width along a continuous and substantial portion of the entire length of the recess;
   wherein during a process of a working load F2 growing from small to large, the elastomer combined device satisfies the following relationship:
   when F2 is smaller than F1, the large-stiffness elastic element is compressed to deform at first;
   when F2 is equal to F1, the large-stiffness elastic element and the pre-compressed small-stiffness elastic element are at a critical state;

until when F2 is larger than F1, the small-stiffness elastic element starts to be continuously compressed to deform, so that the elastomer combined device has a two-stage variable stiffness property being hard at first and then becoming soft at the load state.

2. The elastomer combined device of claim 1, wherein the small-stiffness elastic element includes a conical cylindrical rubber layer, wherein the conical cylindrical rubber layer is arranged between the inner wall of the rigid outer cover and the oriented positioning screw and is vulcanized with the inner wall of the rigid outer cover and the oriented positioning screw, and the conical cylindrical rubber layer is at a pre-compression state under the tightening function of the locking nut.

3. The elastomer combined device of claim 1, wherein the small-stiffness elastic element is provided with a cylindrical overlapped rubber layer integrally vulcanization molded by multiple layers of sheet metals and multiple layers of sheet rubber, which are arranged in a staggered manner, the cylindrical overlapped rubber layer is sleeved on the oriented positioning screw, one end of the cylindrical overlapped rubber layer is propped against one of the two metal bearing plates, the other end of the cylindrical overlapped rubber layer is propped against the bottom surface of the rigid outer cover, and the cylindrical overlapped rubber layer is at a pre-compression state under the tightening function of the locking nut.

4. The elastomer combined device of claim 1, wherein the small-stiffness elastic element is provided with a metal helical spring, the metal helical spring is sleeved on the oriented positioning screw, one end of the metal helical spring is propped against one of the two metal bearing plates, the other end of the metal helical spring is propped against the bottom surface of the rigid outer cover, and the metal helical spring is at a pre-compression state under the tightening function of the locking nut.

5. The elastomer combined device of claim 1, wherein the small-stiffness elastic element is provided with a metal helical spring, the metal helical spring is sleeved on the oriented positioning screw, one end of the metal helical spring is propped against an end face baffle, the other end of the metal helical spring is propped against the bottom surface of the rigid outer cover, and the metal helical spring is at a pre-compression state under the tightening function of the locking nut.

6. The elastomer combined device of any of claims 1-5, wherein the small-stiffness elastic element is composed of two or more independent elastic elements which are combined in series, in parallel or in series and parallel.

7. The elastomer combined device of any of claims 1-5, wherein the large-stiffness elastic element is composed of two or more independent elastic elements which are combined in series, in parallel, or in series and parallel.

8. The elastomer combined device of claim 7, wherein the large-stiffness elastic element is composed of more than two independent elastic elements which are combined in series, in parallel, or in series and parallel.

* * * * *